United States Patent
Zhang et al.

(10) Patent No.: US 11,003,646 B2
(45) Date of Patent: May 11, 2021

(54) DATA ISOLATION IN A BLOCKCHAIN NETWORK

(71) Applicant: Advanced New Technologies Co., Ltd., Grand Cayman (KY)

(72) Inventors: Wenbin Zhang, Hangzhou (CN); Chao Shen, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/421,329

(22) Filed: May 23, 2019

(65) Prior Publication Data

US 2019/0278758 A1 Sep. 12, 2019

Related U.S. Application Data

(63) Continuation of application No. PCT/CN2018/120805, filed on Dec. 13, 2018.

(51) Int. Cl.
*G06F 16/22* (2019.01)
*G06F 16/182* (2019.01)
(Continued)

(52) U.S. Cl.
CPC ...... *G06F 16/2246* (2019.01); *G06F 16/1805* (2019.01); *G06F 16/1824* (2019.01);
(Continued)

(58) Field of Classification Search
CPC ............. G06F 16/2246; G06F 16/1824; G06F 16/1805; G06F 16/1834; H04L 9/0643;
(Continued)

(56) References Cited

U.S. PATENT DOCUMENTS

2017/0132621 A1* 5/2017 Miller ................ G06Q 20/3829
2018/0183600 A1 6/2018 Davis
(Continued)

FOREIGN PATENT DOCUMENTS

CN 104750784 7/2015
CN 106559211 4/2017
(Continued)

OTHER PUBLICATIONS

Nakamoto, "Bitcoin: A Peer-to-Peer Electronic Cash System," www.bitcoin.org/bitcoin.pdf (last accessed Feb. 26, 2020), 2005, 9 pages. (Year: 2005).*

(Continued)

*Primary Examiner* — Mark D Featherstone
*Assistant Examiner* — Ranjit P Doraiswamy
(74) *Attorney, Agent, or Firm* — Fish & Richardson P.C.

(57) ABSTRACT

Implementations of the present specification include receiving, by a blockchain node in the blockchain network, a request to read a particular block of the blockchain, wherein the request is received from a light-weight node of the blockchain network and includes an identity of the light-weight node, and wherein the particular block includes an original Merkle tree associated with the particular block; identifying, by the blockchain node, permissions associated with the identity of the light-weight node; generating, by the blockchain node, an isolated Merkle tree based on the original Merkle tree included in the block, the isolated Merkle tree including only transactions from the original Merkle tree that are determined to be accessible by the light-weight node based on the identified permissions, wherein the isolated Merkle tree is consistent with the original Merkle tree; and sending, by the blockchain node, a response to the light-weight node including the isolated Merkle tree.

22 Claims, 6 Drawing Sheets

(51) Int. Cl.
  *G06F 16/18* (2019.01)
  *H04L 9/06* (2006.01)
  *H04L 9/32* (2006.01)

(52) U.S. Cl.
  CPC ........ *G06F 16/1834* (2019.01); *H04L 9/0643* (2013.01); *H04L 9/3239* (2013.01); *H04L 2209/38* (2013.01); *H04L 2209/805* (2013.01)

(58) Field of Classification Search
  CPC ............... H04L 9/3239; H04L 2209/38; H04L 2209/805
  See application file for complete search history.

(56) References Cited

U.S. PATENT DOCUMENTS

| | | | |
|---|---|---|---|
| 2018/0240114 A1 | 8/2018 | Li | |
| 2018/0349621 A1* | 12/2018 | Schvey | G06F 21/40 |
| 2019/0180047 A1* | 6/2019 | Matetic | G06F 9/545 |

FOREIGN PATENT DOCUMENTS

| | | |
|---|---|---|
| CN | 106796688 | 5/2017 |
| CN | 106899412 | 6/2017 |
| CN | 107733855 | 2/2018 |
| CN | 108664803 | 10/2018 |
| CN | 108961052 | 12/2018 |
| JP | 2007503134 | 2/2007 |
| JP | 2015091137 | 5/2015 |
| RU | 181439 | 7/2018 |
| WO | WO 2018223042 | 12/2018 |
| WO | WO-2019207504 A1 * | 10/2019 ........... G06F 16/278 |

OTHER PUBLICATIONS

PCT International Search Report and Written Opinion in International Application No. PCT/CN2018/120805, dated Sep. 11, 2019, 7 pages.

Corda.net [Online], "Transaction tear-offs—R3 Corda Master documentation," Jan. 2018, [Retrieved from Feb. 25, 2020], retrieved from: URL <https://docs.corda.net/key-concepts-tearoffs.html>, 3 pages.

European Extended Search Report in European Patent Application No. 18867254.7, dated Feb. 7, 2020, 8 pages.

Github.com [Online], "CORDA-1514 Add nested Merkle trees protocol by kchalkias; Pull Request #3506; corda/corda.Github," Jul. 2018, [Retrieved on Jan. 30, 2020], retrieved from: URL<https://github.com/corda/corda/pul1/3506/files>, 3 pages.

Crosby et al., "BlockChain Technology: Beyond Bitcoin," Sutardja Center for Entrepreneurship & Technology Technica Report, Oct. 16, 2015, 35 pages.

Nakamoto, "Bitcoin: A Peer-to-Peer Electronic Cash System," www.bitcoin.org, 2005, 9 pages.

Wikipedia.com [online], "Markle Tree", dated Dec. 12, 2018, retrieved on Jan. 26, 2021, retrieved from URL<https://en.wikipedia.org/w/index.php?title=Merkle_tree&oldid=873243067>, 5 pages.

* cited by examiner

DATA ISOLATION IN A BLOCKCHAIN NETWORK

CROSS-REFERENCE TO RELATED APPLICATIONS

This application is a continuation of PCT Application No. PCT/CN2018/120805, filed on Dec. 13, 2018, which is hereby incorporated by reference in its entirety.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular use case (e.g., crypto-currencies). Example types of blockchain networks can include public blockchain networks, private blockchain networks, and consortium blockchain networks. A public blockchain network is open for all entities to use the DLS, and participate in the consensus process. A private blockchain network is provided for particular entity, which centrally controls read and write permissions. A consortium blockchain network is provided for a selected group of entities, which control the consensus process, and includes an access control layer.

Blockchain networks may include different types of nodes. Fully-participating nodes (hereinafter referred to as "blockchain nodes") participate in the consensus process for the blockchain network by attempting to construct and validate new blocks of transactions to add to the blockchain. Light-weight nodes do not participate in the consensus process for the blockchain network, and may not fully synchronize their own internal representation of the blockchain. For example, a light-weight node may synchronize only the block header information rather than all of the transaction data in a particular block in the blockchain.

In private or consortium blockchain networks, nodes (such as the light-weight nodes) may only have permission to read certain transactions from the blockchain, such as, for example, transactions in which an identity associated with the light-weight node participated. In such a case, the light-weight node may query a blockchain node for a particular block, and may be returned a representation of the block (e.g., a Merkle tree) with the transactions to which it does not have access removed. A Merkle tree constructed in this manner may be inconsistent with the full Merkle tree representing the transactions in the block, which can lead to errors at the light-weight node due to the node not possessing an accurate representation of the block.

SUMMARY

Implementations of the present specification include computer-implemented methods for enforcing data isolation in a blockchain network while still providing all nodes in the blockchain network with a consistent representation of blocks in the blockchain. More particularly, implementations of the present specification are directed to producing a Merkle tree that does not include data from which the requesting node is isolated, but that is still consistent with a full Merkle tree representing the requested block.

In some implementations, actions include receiving, by a blockchain node in the blockchain network, a request to read a particular block of the blockchain, wherein the request is received from a light-weight node of the blockchain network and includes an identity of the light-weight node, and wherein the particular block includes an original Merkle tree containing a plurality of transactions associated with the particular block; identifying, by the blockchain node, permissions associated with the identity of the light-weight node; generating, by the blockchain node, an isolated Merkle tree based on the original Merkle tree included in the block, the isolated Merkle tree including only transactions from the original Merkle tree that are determined to be accessible by the light-weight node based on the identified permissions, wherein the isolated Merkle tree is consistent with the original Merkle tree; and sending, by the blockchain node, a response to the light-weight node including the isolated Merkle tree. Other implementations include corresponding systems, apparatus, and computer programs, configured to perform the actions of the methods, encoded on computer storage devices.

These and other implementations may each optionally include one or more of the following features.

In some implementations, generating the isolated Merkle tree based on the original Merkle tree included in the particular block may include: modifying the original Merkle tree to produce the isolated Merkle tree, including removing all transactions that are determined not to be accessible by the light-weight node from the original Merkle tree; and removing branches of the original Merkle tree from which all transactions have been removed leaving only the root hash of each of the branches intact.

In some implementations, a transaction is determined not to be accessible by the light-weight node if the permissions indicate that the light-weight node does not have read access to the transaction.

In some cases, each of the plurality of transactions includes one or more identities associated with one or more participants in the transaction.

In some implementations, the identity is associated with an identity class, the permissions are associated with the identity class, and the blockchain node is configured to enforce permissions associated with the identity class on identities associated with the identity class.

In some cases, the identity class is a regulator class, and wherein the permissions associated with the regulator class indicate that all transactions in the blockchain network are accessible to identities associated with the regulator class.

In some implementation, the identity class is a common class, and wherein the permissions associated with the common class indicate that only transactions in the blockchain network in which the identity is a participant are accessible to the identity.

In some cases, the isolated Merkle tree is consistent with the original Merkle tree only if it is sufficient to enable the light-weight node to verify the transactions in the isolated Merkle tree based on the hashes in the isolated Merkle tree.

The present specification also provides one or more non-transitory computer-readable storage media coupled to one or more processors and having instructions stored thereon which, when executed by the one or more processors, cause the one or more processors to perform operations in accordance with implementations of the methods provided herein.

The present specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present specification may include any combination of the aspects and features described herein. That is, methods in accordance with the present specification are not limited to the combinations of aspects and features specifically described herein, but also include any combination of the aspects and features provided.

The details of one or more implementations of the present specification are set forth in the accompanying drawings and the description below. Other features and advantages of the present specification will be apparent from the description and drawings, and from the claims.

DESCRIPTION OF DRAWINGS

Like reference symbols in the various drawings indicate like elements.

DETAILED DESCRIPTION

Implementations of the present specification include computer-implemented methods for enforcing data isolation in a blockchain network while still providing all nodes in the blockchain network with a consistent representation of blocks in the blockchain. More particularly, implementations of the present specification are directed to producing a Merkle tree that does not include data from which the requesting node is isolated, but that is still consistent with a full Merkle tree representing the requested block.

In some implementations, actions include receiving, by a blockchain node in the blockchain network, a request to read a particular block of the blockchain, wherein the request is received from a light-weight node of the blockchain network and includes an identity of the light-weight node, and wherein the particular block includes an original Merkle tree containing a plurality of transactions associated with the particular block; identifying, by the blockchain node, permissions associated with the identity of the light-weight node; generating, by the blockchain node, an isolated Merkle tree based on the original Merkle tree included in the block, the isolated Merkle tree including only transactions from the original Merkle tree that are determined to be accessible by the light-weight node based on the identified permissions, wherein the isolated Merkle tree is consistent with the original Merkle tree; and sending, by the blockchain node, a response to the light-weight node including the isolated Merkle tree.

To provide further context for implementations of the present specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with various cryptocurrency networks, blockchain is used herein to generally refer to a DLS without reference to any particular use case. As introduced above, a blockchain network can be provided as a public blockchain network, a private blockchain network, or a consortium blockchain network.

In a public blockchain network, the consensus process is controlled by nodes of the consensus network. For example, hundreds, thousands, even millions of entities can cooperate a public blockchain network, each of which operates at least one node in the public blockchain network. Accordingly, the public blockchain network can be considered a public network with respect to the participating entities. In some examples, a majority of entities (nodes) must sign every block in order for the block to be valid, and added to the blockchain (distributed ledger) of the blockchain network. Examples of public blockchain networks include various cryptocurrency networks, which are peer-to-peer payment networks. Cryptocurrency networks can leverage a distributed ledger, referred to as a blockchain. As noted above, the term blockchain, however, is used to generally refer to distributed ledgers without particular reference to any particular cryptocurrency network.

In general, a public blockchain network supports public transactions. A public transaction is shared with all of the nodes within the public blockchain network, and are stored in a global blockchain. A global blockchain is a blockchain that is replicated across all nodes. That is, all nodes are in perfect state consensus with respect to the global blockchain. To achieve consensus (e.g., agreement to the addition of a block to a blockchain), a consensus protocol is implemented within the public blockchain network. An example consensus protocol includes, without limitation, proof-of-work (POW) implemented in cryptocurrency networks.

In general, a private blockchain network is provided for a particular entity, which centrally controls read and write permissions. The entity controls, which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

Implementations of the present specification are described in further detail herein with reference to a private blockchain network, in which particular data may be isolated from certain participating entities based on a configuration of the blockchain network. It is contemplated, however, that implementations of the present specification can be realized in any appropriate type of blockchain network.

Implementations of the present specification are described in further detail herein in view of the above context. More particularly, and as introduced above, implementations of the present specification are directed to producing a Merkle tree that does not include data from which the requesting node is isolated, but that is still consistent with a full Merkle tree representing the requested block.

In some implementations, a light-weight node can request a particular block from a blockchain node participating in the network. The blockchain node can determine that the light-weight node does not have permission to read certain transactions in the block. The blockchain node can remove these transactions from a copy of the full Merkle tree representing the requested block, but can leave only the root hashes for any branches of tree that contain only removed transactions. Doing so can effectively isolate the light-weight node from the transaction data it is not authorized to read, and can also allow the light-weight node to be presented with a representation of the block that is consistent with the full Merkle tree for the block. This can allow the light-weight node to verify the integrity of the block (by examining the hashes in the Merkle tree) even without having access to the transaction data from which it is isolated.

Figure 1:
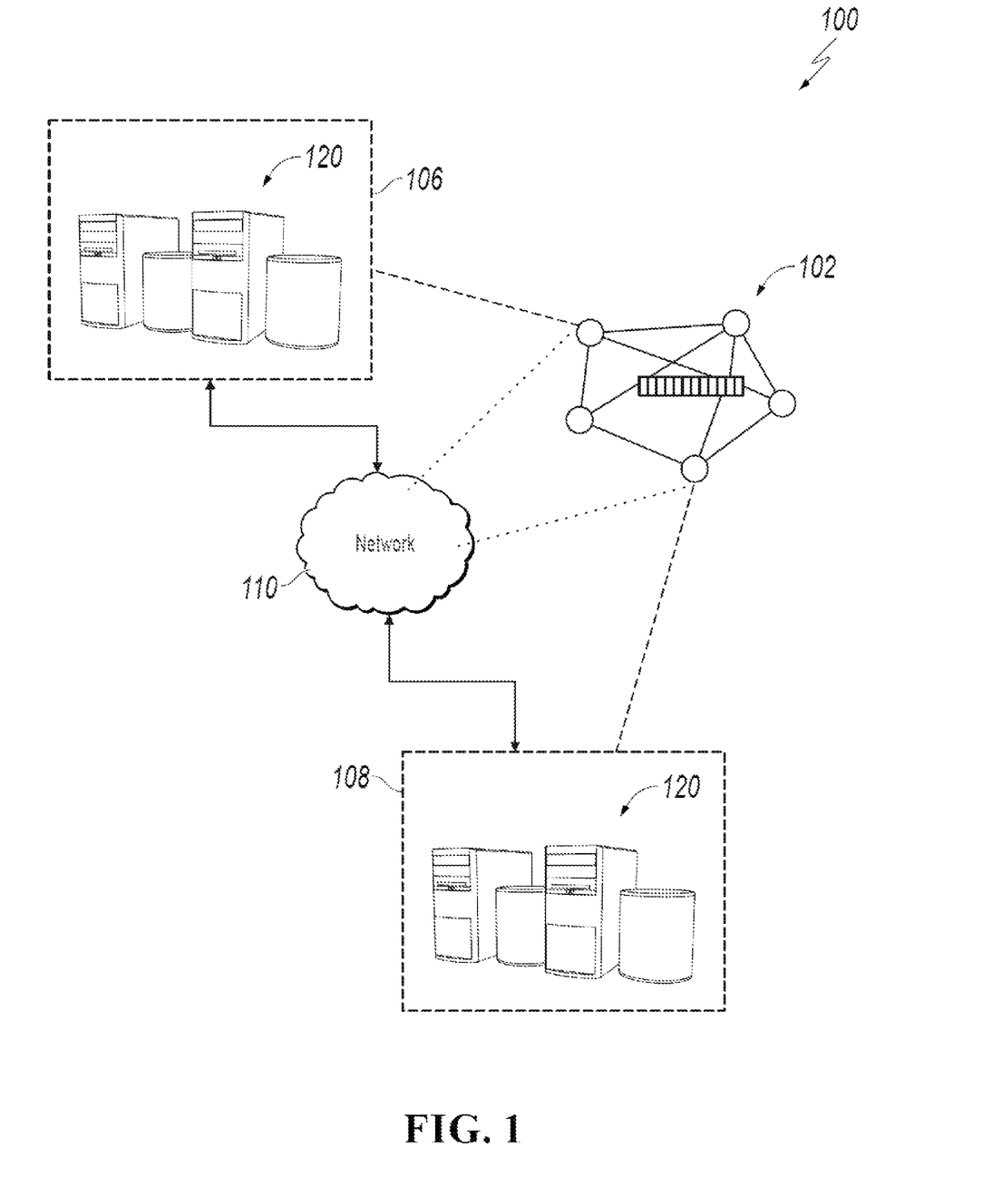
FIG. 1 depicts an example environment that can be used to execute implementations of the present specification.

FIG. 1 depicts an example environment 100 that can be used to execute implementations of the present specification. In some examples, the example environment 100 enables entities to participate in a private blockchain network 102. The example environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link.

In the depicted example, the computing systems 106, 108 can each include any appropriate computing system that enables participation as a node in the private blockchain network 102. Example computing devices include, without limitation, a server, a desktop computer, a laptop computer, a tablet computing device, and a smartphone. In some examples, the computing systems 106, 108 hosts one or more computer-implemented services for interacting with the private blockchain network 102. For example, the computing system 106 can host computer-implemented services of a first entity (e.g., user A), such as transaction management system that the first entity uses to manage its transactions with one or more other entities (e.g., other users). The computing system 108 can host computer-implemented services of a second entity (e.g., user B), such as transaction management system that the second entity uses to manage its transactions with one or more other entities (e.g., other users). In the example of FIG. 1, the private blockchain network 102 is represented as a peer-to-peer network of nodes, and the computing systems 106, 108 provide nodes of the first entity, and second entity respectively, which participate in the private blockchain network 102.

Figure 2:
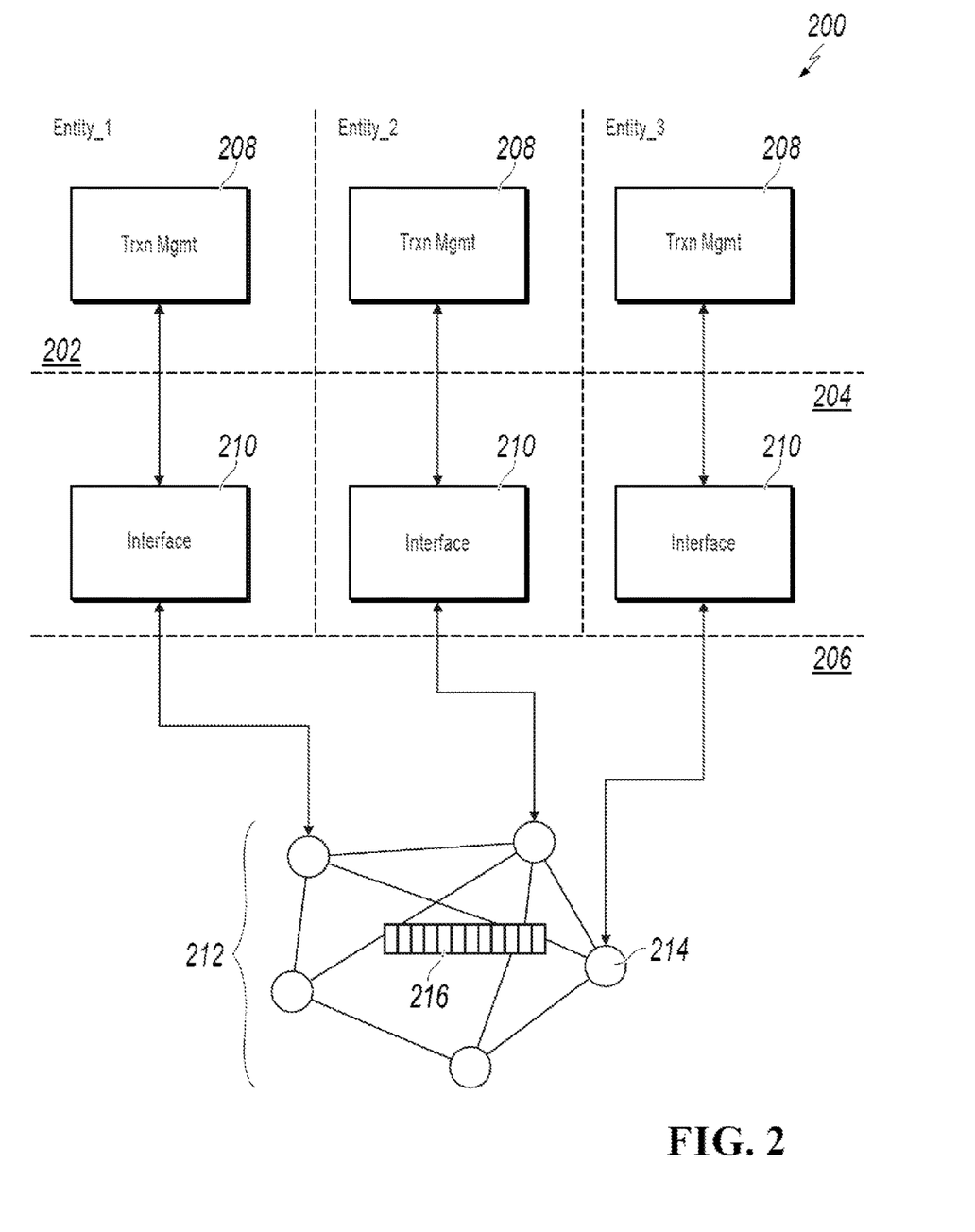
FIG. 2 depicts an example conceptual architecture in accordance with implementations of the present specification.

FIG. 2 depicts an example conceptual architecture 200 in accordance with implementations of the present specification. The example conceptual architecture 200 includes an entity layer 202, a hosted services layer 204, and a blockchain network layer 206. In the depicted example, the entity layer 202 includes three entities, Entity_1 (E1), Entity_2 (E2), and Entity_3 (E3), each entity having a respective transaction management system 208.

In the depicted example, the hosted services layer 204 includes interfaces 210 for each transaction management system 210. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some implementations, the blockchain 216 stores information associated with transactions that are performed between two or more entities participating in the private blockchain network.

Figure 3A:
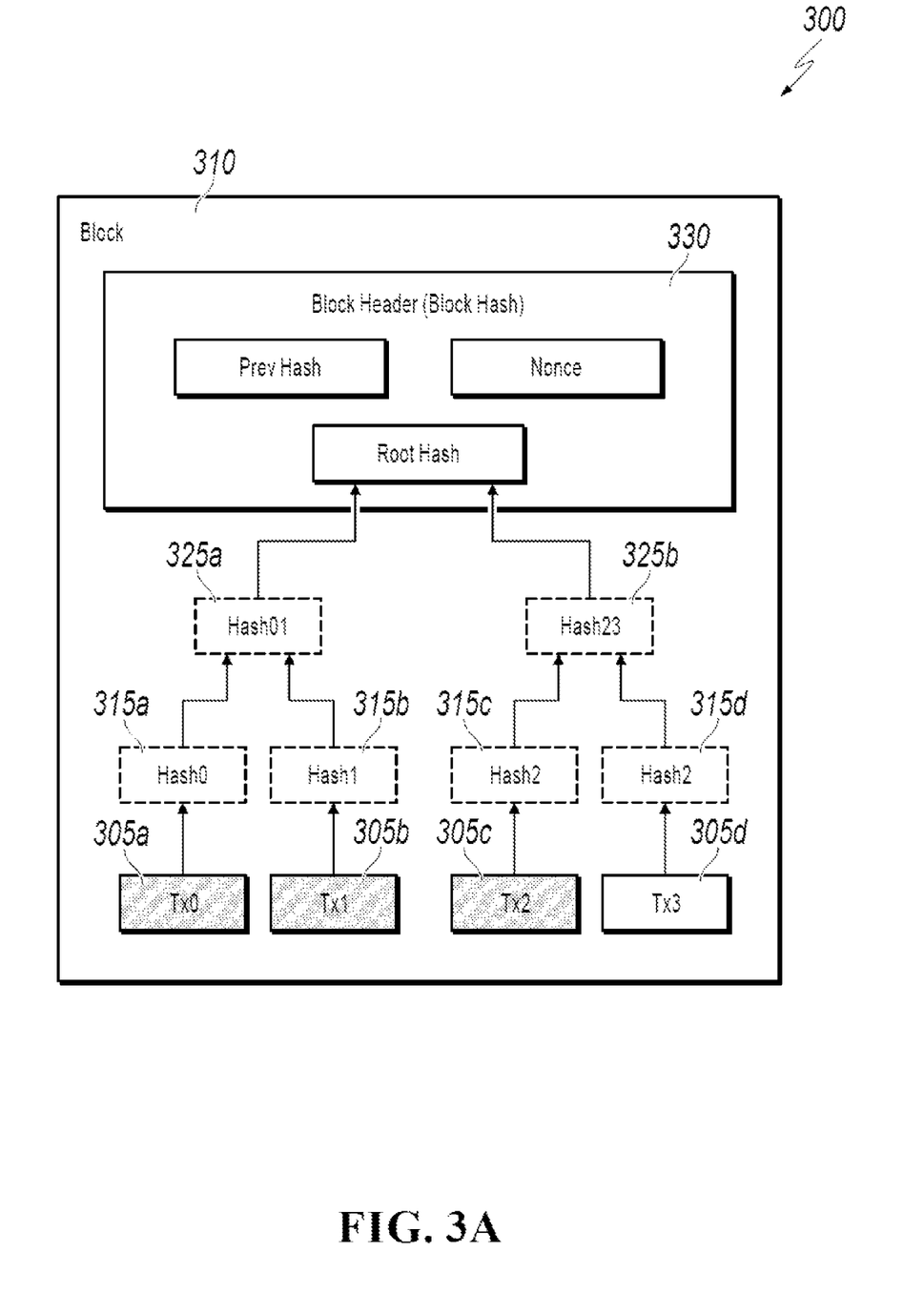
FIG. 3A depicts an example Merkle tree for a block in a blockchain in accordance with implementations of the present specification.

FIG. 3A depicts an example Merkle tree 300 for a block 310 in a blockchain in accordance with implementations of the present specification. As shown, the Merkle tree 300 includes a block header which includes a hash value for all the data in the block, as well as a hash of the previous block in the block chain and a nonce value. The block header also includes a root hash which is a concatenation of the two hashes directly below it in the Merkle tree (325a, b).

The leaf nodes of the Merkle tree 300 include transactions 305 a-d representing transactions recorded in this particular block 310 of the block chain. The Merkle tree 300 also includes hashes 315a-d. Each of these hashes 315a-d is a hash value generated based on the transaction data for transaction 305a-d, respectively. For example, the hash 315a may be generated by providing the data in transaction 305a as input to an SHA 256 hashing algorithm to produce the hash value 315a. In some implementations, any hash function with guaranteed uniqueness can be used to produce the hashes 315a-d.

The Merkle tree 300 also includes hashes 325a ("Hash01") and 325b ("Hash23"). The hashes 325a-b are produced by concatenating the two hashes directly below in the Merkle tree. For example, hash 325a ("Hash01") is produced by concatenating hashes 315a ("Hash0") and 315b ("Hash1"). Similarly, as described above, the root hash in the block header is constructed by concatenating hash 325a and hash 325b.

Figure 3B:
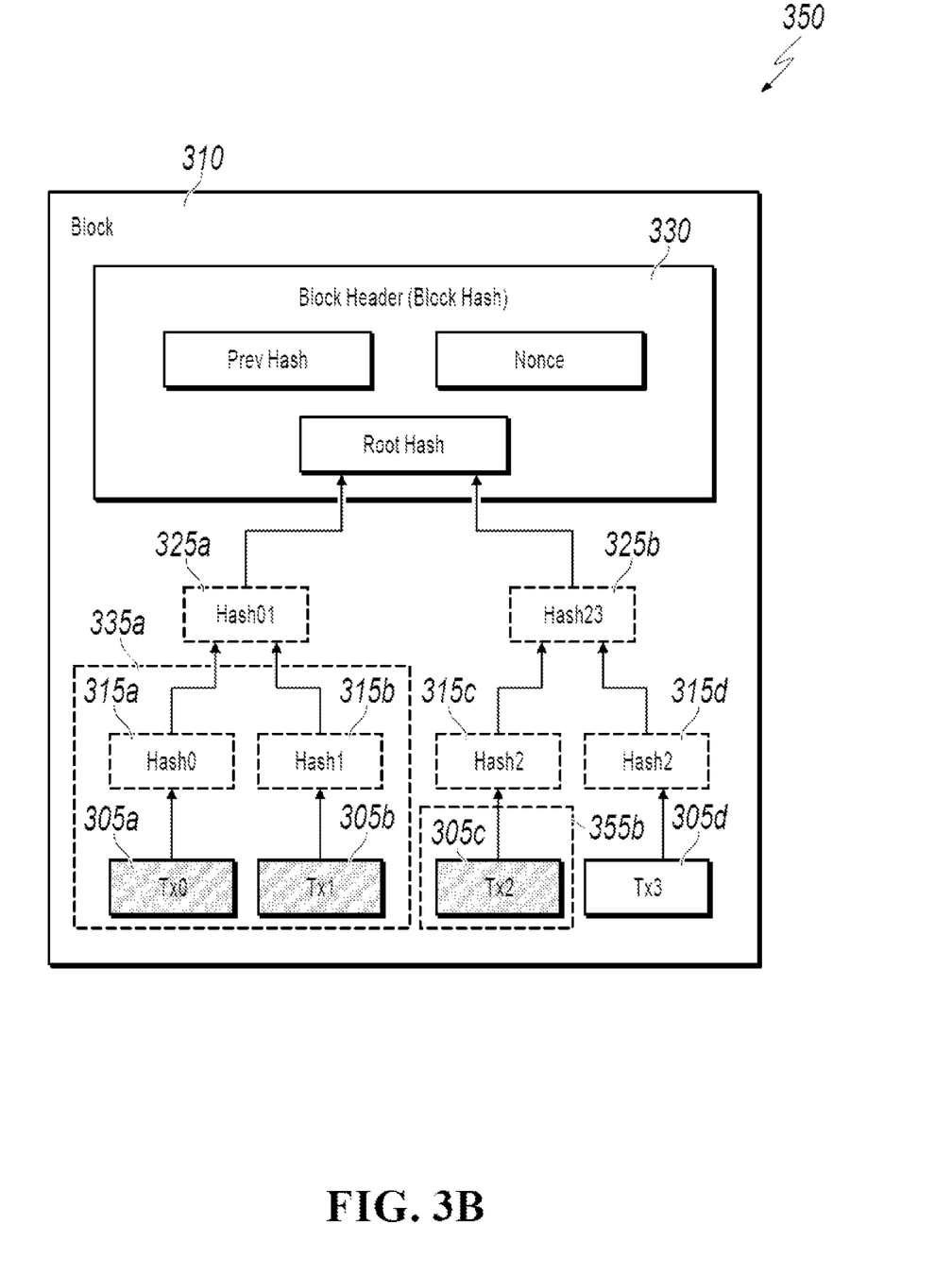
FIG. 3B depicts the example Merkle tree of FIG. 3A with branches including isolated transactions in accordance with implementations of the present specification.

Transactions 305a-c, shown shaded in grey in FIG. 3A, represent transactions that an entity (e.g., a light-weight node) requesting the block 310 does not have permission to access. FIG. 3B depicts an example Merkle tree 350 in which the branches 335a,b of the Merkle tree 300, which include only transactions from which the requesting entity is to be isolated, are indicated by the dashed line boxes surrounding the branches.

Figure 3C:
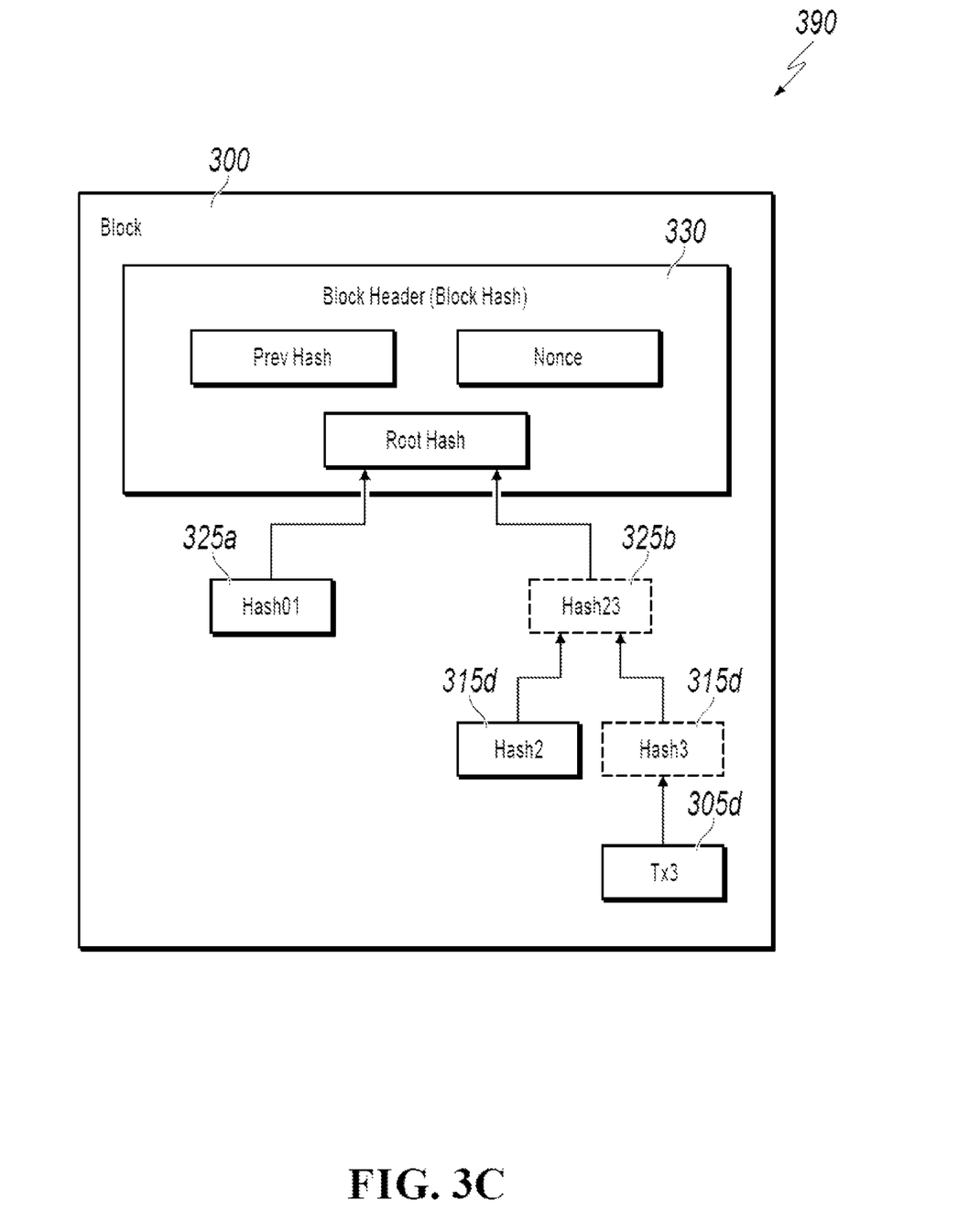
FIG. 3C depicts an example isolated Merkle tree produced based on the Merkle tree in FIG. 3A in accordance with implementations of the present specification.

FIG. 3C depicts an example isolated Merkle tree 390 produced based on the Merkle tree in FIG. 3A in accordance with implementations of the present specification. As shown, the branches 335a and 335b identified in the prior FIG. 3B have been removed in the isolated Merkle tree 390.

In some implementations, an isolated Merkle tree like example 390 can be produced by applying a software algorithm to a full Merkle tree, such as the one shown in FIG. 3A. In one example algorithm, a blockchain node receives a request from a light-weight node to read a certain block. The blockchain node scans the transactions in the requested block, and determines whether the light-weight node has permission to read each transaction based on an identity attribute included in the request and permissions associated with the identity.

In the example algorithm, the blockchain node scans sequentially through the transactions in the block, which by definition are stored in the leaf nodes of the Merkle tree. For each transaction, if the light-weight node has permission to read the transaction, the blockchain node moves to the next transaction. If the blockchain node finds a transaction Tx_i that the light-weight node does not have permission to read, the blockchain node continues to scan subsequent transactions until it again finds a transaction Tx_j the light-weight node has permission to read. The blockchain node then removes the group of transactions from Tx_i to Tx_(j−1), all of which the light-weight does not have permission to read. In addition, the blockchain node removes any branch from the Merkle tree that now includes no transactions, and leaves only the root hash of that particular branch. As shown in FIGS. 3B and 3C, this branch removal process is applied to branches 335a and 335b.

This scanning and processing of transactions is continued until the last transaction in the Merkle tree is processed, and a Merkle tree including transactions that the light-weight node has permission to read is obtained. This isolated Merkle tree is returned to the light-weight node.

Figure 4:
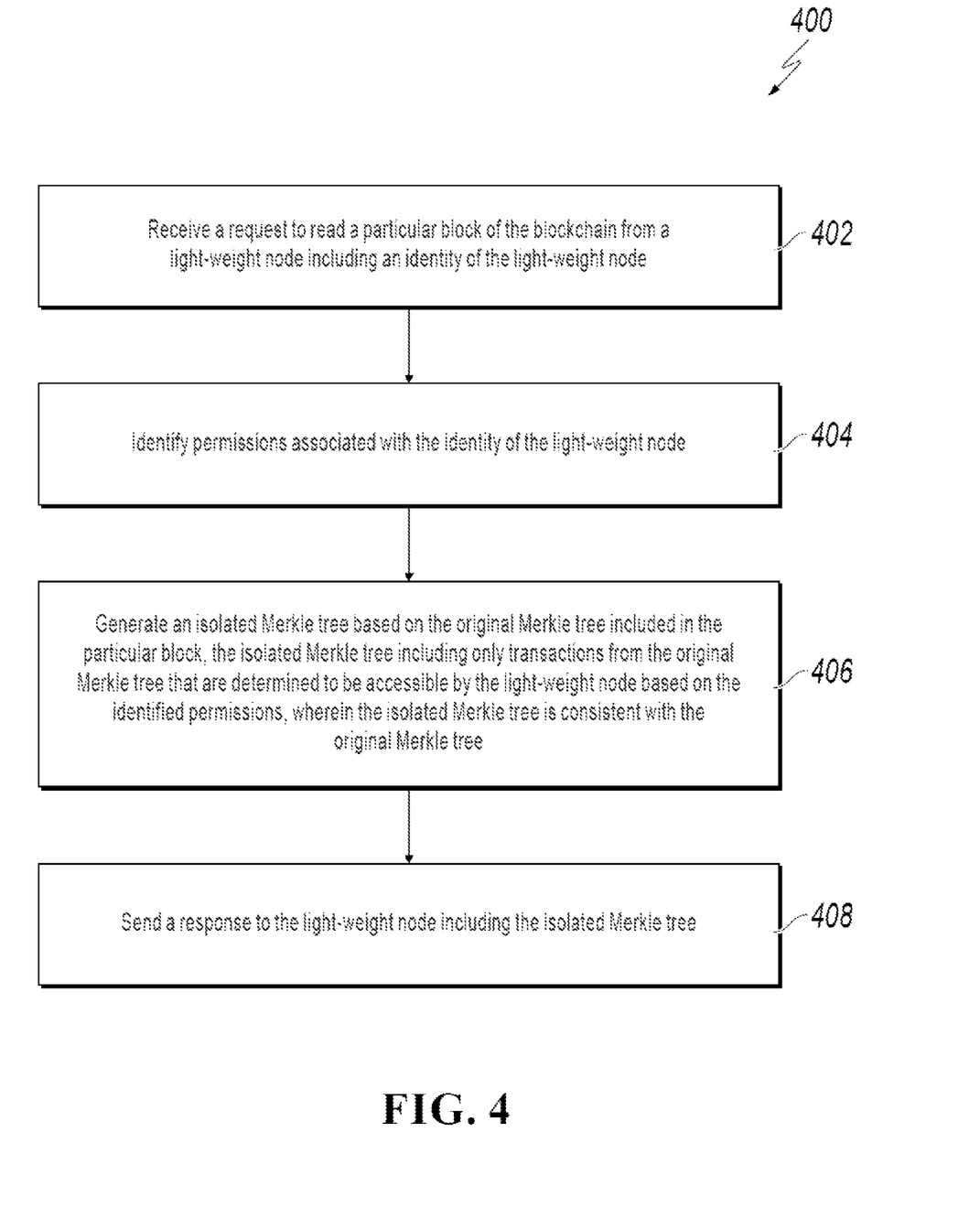
FIG. 4 depicts an example process that can be executed in accordance with implementations of the present specification.

FIG. 4 depicts an example process 400 that can be executed in accordance with implementations of the present specification. In some implementations, the example process 400 may be performed using one or more computer-executable programs executed using one or more computing devices.

At 402, a blockchain node receives a request to read a particular block of the blockchain from a light-weight node of the blockchain network. The request includes an identity of the light-weight node, and the particular block which includes an original Merkle tree containing a plurality of transactions associated with the particular block. In some cases, each of the plurality of transactions includes one or more identities associated with one or more participants in the transaction. From 402, the method 400 continues to 404.

At 404, the blockchain node identifies permissions associated with the identity of the light-weight node. In some cases, the identity is associated with an identity class, the permissions are associated with the identity class, and the blockchain node is configured to enforce permissions associated with the identity class on identities associated with the identity class. In some implementations, the identity class is a regulator class, and wherein the permissions associated with the regulator class indicate that all transactions in the blockchain network are accessible to identities associated with the regulator class. In some cases, the identity class is a common class, and wherein the permissions associated with the common class indicate that only transactions in the blockchain network in which the identity is a participant are accessible to the identity. From 404, the method 400 continues to 406.

At 406, the blockchain node generates an isolated Merkle tree based on the original Merkle tree included in the particular block. The isolated Merkle tree includes only transactions from the original Merkle tree that are determined to be accessible by the light-weight node based on the identified permissions. In some implementations, a transaction is determined not to be accessible by the light-weight node if the permissions indicate that the light-weight node does not have read access to the transaction. The isolated Merkle tree is consistent with the original Merkle tree. In some implementations, the isolated Merkle tree is consistent with the original Merkle tree only if it is sufficient to enable the light-weight node to verify the transactions in the isolated Merkle tree based on the hashes in the isolated Merkle tree. In some cases, generating the isolated Merkle tree includes modifying the original Merkle tree to produce the isolated Merkle tree, including removing all transactions that are determined not to be accessible by the light-weight node from the original Merkle tree, and removing branches of the original Merkle tree from which all transactions have been removed leaving the root hash of each of the braches intact. From 406, the method 400 continues to 408.

At 408, the blockchain node sends a response to the light-weight node including the isolated Merkle tree. From 408, the method 400 stops.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will be coupled to at least one non-transitory computer-readable storage medium (also referred to as a computer-readable memory). The storage medium coupled to the computer can be an internal component of the computer (e.g., an integrated hard drive) or an external component (e.g., universal serial bus (USB) hard drive or a storage system accessed over a network). Examples of storage media can include, for example, magnetic, magneto-optical, or optical disks, solid state drives, network storage resources such as cloud storage systems, or other types of storage media. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method for protecting sensitive data stored on a blockchain maintained by a blockchain network, the method comprising:
receiving, by a blockchain node in the blockchain network, a request to read a particular block of the blockchain, wherein the request is received from a light-weight node of a plurality of light-weight nodes of the blockchain network and includes an identity of the light-weight node, wherein the particular block is represented by an original Merkle tree containing a plurality of branches and a block header, each branch of the original Merkle tree comprising a plurality of transactions, a plurality of first hash values that are generated based on respective corresponding transactions, and a second hash value that is generated by concatenating the first hash values, the block header of the original Merkle tree comprising a block hash value that comprises a root hash value generated by concatenating the second hash value of each branch of the original Merkle tree, a hash of a previous block, and a nonce value;
responsive to receiving the request, identifying, by the blockchain node, permissions associated with the identity of the light-weight node;
responsive to identifying the permissions, determining a subset of transactions from the plurality of transactions that are accessible by the light-weight node based on the identified permissions;
responsive to determining the subset of transactions, generating, by the blockchain node, an isolated Merkle tree, comprising
removing, from the original Merkle tree, transactions other than the subset of transactions among the plurality of transactions and the first hash value associated with at least one of the transactions other than the subset of transactions,
removing, from the original Merkle tree, branches from which all transactions have been removed,
including, in the isolated Merkle tree, root hashes of the branches from which all transactions have been removed, and
including, in the isolated Merkle tree, transactions included in the subset of transactions and respective first hash values corresponding to the transactions included in the subset of transactions,
wherein the isolated Merkle tree permits the light-weight node to verify integrity of the particular block without having access to the transactions that were a part of the original Merkle tree and not included in the subset of transactions; and
sending, by the blockchain node, a response to the light-weight node, the response comprising the isolated Merkle tree, wherein the original Merkle tree is designed to be sent to one or more nodes other than the plurality of light-weight nodes within the blockchain network.

2. The computer-implemented method of claim 1, wherein generating the isolated Merkle tree comprises scanning sequentially through each transaction of the plurality of transactions, until a last transaction in the plurality of transactions is processed.

3. The computer-implemented method of claim 1, wherein each of the transactions other than the subset of transactions is excluded from the subset of transactions based on the permissions indicating that the light-weight node is prevented from having read access to the transaction.

4. The computer-implemented method of claim 1, wherein each of the plurality of transactions includes one or more identities associated with one or more participants in the transaction, wherein the one or more identities comprise the identity of the light-weight node, wherein the one or more participants comprise the light-weight node.

5. The computer-implemented method of claim 4, wherein the identity of the light-weight node is associated with an identity class, the permissions are associated with the identity class, and the blockchain node is configured to enforce the permissions on identities associated with the identity class.

6. The computer-implemented method of claim 5, wherein the identity class is a regulator class, and wherein the permissions associated with the regulator class indicate that all transactions in the blockchain network are accessible to identities associated with the regulator class.

7. The computer-implemented method of claim 5, wherein the identity class is a common class, and wherein the permissions associated with the common class indicate that only transactions in the blockchain network in which the identity is a participant are accessible to the identity.

8. A non-transitory computer-readable storage medium storing one or more instructions that, when executed by a computer system, cause the computer system to perform operations comprising:
receiving, by a blockchain node in a blockchain network, a request to read a particular block of a blockchain of the blockchain network, wherein the request is received from a light-weight node of a plurality of light-weight nodes of the blockchain network and includes an identity of the light-weight node, wherein the particular block is represented by an original Merkle tree containing a plurality of branches and a block header, each branch of the original Merkle tree comprising a plurality of transactions, a plurality of first hash values that are generated based on respective corresponding transactions, and a second hash value that is generated by concatenating the first hash values, the block header of the original Merkle tree comprising a block hash value that comprises a root hash value generated by concatenating the second hash value of each branch of the original Merkle tree, a hash of a previous block, and a nonce value;
responsive to receiving the request, identifying, by the blockchain node, permissions associated with the identity of the light-weight node;
responsive to identifying the permissions, determining a subset of transactions from the plurality of transactions that are accessible by the light-weight node based on the identified permissions;
responsive to determining the subset of transactions, generating, by the blockchain node, an isolated Merkle tree, comprising
removing, from the original Merkle tree, transactions other than the subset of transactions among the plurality of transactions and the first hash value associated with at least one of the transactions other than the subset of transactions,
removing, from the original Merkle tree, branches from which all transactions have been removed,
including, in the isolated Merkle tree, root hashes of the branches from which all transactions have been removed, and including, in the isolated Merkle tree, transactions included in the subset of transactions and respective first hash values corresponding to the transactions included in the subset of transactions,
wherein the isolated Merkle tree permits the light-weight node to verify integrity of the particular block without having access to the transactions that were a part of the original Merkle tree and not included in the subset of transactions; and
sending, by the blockchain node, a response to the light-weight node, the response comprising the isolated Merkle tree, wherein the original Merkle tree is designed to be sent to one or more nodes other than the plurality of light-weight nodes within the blockchain network.

9. The non-transitory computer-readable medium of claim 8, wherein generating the isolated Merkle tree comprises scanning sequentially through each transaction of the plurality of transactions, until a last transaction in the plurality of transactions is processed.

10. The non-transitory computer-readable medium of claim 8, wherein each of the transactions other than the subset of transactions is excluded from the subset of transactions based on the permissions indicating that the light-weight node is prevented from having read access to the transaction.

11. The non-transitory computer-readable medium of claim 8, wherein each of the plurality of transactions includes one or more identities associated with one or more participants in the transaction, wherein the one or more identities comprise the identity of the light-weight node, wherein the one or more participants comprise the light-weight node.

12. The non-transitory computer-readable medium of claim 11, wherein the identity of the light-weight node is associated with an identity class, the permissions are associated with the identity class, and the blockchain node is configured to enforce the permissions on identities associated with the identity class.

13. The non-transitory computer-readable medium of claim 12, wherein the identity class is a regulator class, and wherein the permissions associated with the regulator class indicate that all transactions in the blockchain network are accessible to identities associated with the regulator class.

14. The non-transitory computer-readable medium of claim 12, wherein the identity class is a common class, and wherein the permissions associated with the common class indicate that only transactions in the blockchain network in which the identity is a participant are accessible to the identity.

15. A system comprising:
one or more computers; and
one or more computer memory devices interoperably coupled with the one or more computers and having tangible, non-transitory, machine-readable media storing one or more instructions that, when executed by the one or more computers, cause the one or more computers to perform one or more operations comprising:
receiving, by a blockchain node in a blockchain network, a request to read a particular block of a blockchain of the blockchain network, wherein the request is received from a light-weight node of a plurality of light-weight nodes of the blockchain network and includes an identity of the light-weight node, wherein the particular block is represented by an original Merkle tree containing a plurality of branches and a block header, each branch of the original Merkle tree comprising a plurality of transactions, a plurality of first hash values that are generated based on respective corresponding transactions, and a second hash value that is generated by concatenating the first hash values, the block header of the original Merkle tree comprising a block hash value that comprises a root hash value generated by concatenating the second hash value of each branch of the original Merkle tree, a hash of previous block, and a nonce value;
responsive to receiving the request, identifying, by the blockchain node, permissions associated with the identity of the light-weight node;
responsive to identifying the permissions, determining a subset of transactions from the plurality of transactions that are accessible by the light-weight node based on the identified permissions;
responsive to determining the subset of transactions, generating, by the blockchain node, an isolated Merkle tree, comprising
removing, from the original Merkle tree, transactions other than the subset of transactions among the plurality of transactions and the first hash value associated with at least one of the transactions other than the subset of transactions,
removing, from the original Merkle tree, branches from which all transactions have been removed,
including, in the isolated Merkle tree, root hashes of the branches from which all transactions have been removed, and
including, in the isolated Merkle tree, transactions included in the subset of transactions and respective first hash values corresponding to the transactions included in the subset of transactions,
wherein the isolated Merkle tree permits the light-weight node to verify integrity of the particular block without having access to the transactions that were a part of the original Merkle tree and not included in the subset of transactions; and
sending, by the blockchain node, a response to the light-weight node, the response comprising the isolated Merkle tree, wherein the original Merkle tree is designed to be sent to one or more nodes other than the plurality of light-weight nodes within the blockchain network.

16. The system of claim 15, wherein generating the isolated Merkle tree comprises scanning sequentially through each transaction of the plurality of transactions, until a last transaction in the plurality of transactions is processed.

17. The system of claim 15, wherein each of the transactions other than the subset of transactions is excluded from the subset of transactions based on the permissions indicating that the light-weight node is prevented from having read access to the transaction.

18. The system of claim 15, wherein each of the plurality of transactions includes one or more identities associated with one or more participants in the transaction, wherein the one or more identities comprise the identity of the light-weight node, wherein the one or more participants comprise the light-weight node.

19. The system of claim 18, wherein the identity of the light-weight node is associated with an identity class, the permissions are associated with the identity class, and the blockchain node is configured to enforce the permissions on identities associated with the identity class.

20. The system of claim 19, wherein the identity class is a regulator class, and wherein the permissions associated with the regulator class indicate that all transactions in the blockchain network are accessible to identities associated with the regulator class.

21. The system of claim 19, wherein the identity class is a common class, and wherein the permissions associated with the common class indicate that only transactions in the blockchain network in which the identity is a participant are accessible to the identity.

22. The computer-implemented method of claim 2, wherein generating the isolated Merkle tree comprises:
- determining that a first transaction of the plurality of transactions is not included in the subset of transactions;
- subsequently scanning one or more other transactions of the plurality of transactions, the one or more other transactions not included in the subset of transactions;
- determining that a second transaction of the plurality of transactions is included in the subset of transactions; and
- subsequent to determining that the second transaction is included in the subset of transactions, removing, from the original Merkle tree, the first transaction and the one or more other transactions.

* * * * *

UNITED STATES PATENT AND TRADEMARK OFFICE
CERTIFICATE OF CORRECTION

PATENT NO. : 11,003,646 B2  
APPLICATION NO. : 16/421329  
DATED : May 11, 2021  
INVENTOR(S) : Wenbin Zhang and Chao Shen Page 1 of 1

It is certified that error appears in the above-identified patent and that said Letters Patent is hereby corrected as shown below:

In the Claims

In Claim 15, Column 14, Line 9, before "previous" insert -- a --.

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*